US010765965B1

(12) United States Patent
Sherwood et al.

(10) Patent No.: US 10,765,965 B1
(45) Date of Patent: Sep. 8, 2020

(54) SYSTEMS, METHODS, AND EQUIPMENT FOR CHEMICAL EXTRACTION

(71) Applicant: Loxley Systems, LLC, Highlands Ranch, CO (US)

(72) Inventors: Raechel Sherwood, Denver, CO (US); Steven Sherwood, Highlands Ranch, CO (US); Reese Cullimore, Boulder, CO (US); Greg Mehos, Westford, MA (US)

(73) Assignee: Loxley Systems, LLC, Highlands Ranch, CO (US)

( * ) Notice: Subject to any disclaimer, the term of this patent is extended or adjusted under 35 U.S.C. 154(b) by 0 days.

(21) Appl. No.: 16/709,648

(22) Filed: Dec. 10, 2019

(51) Int. Cl.
*B01D 11/04* (2006.01)
*B01D 11/02* (2006.01)
*A61L 2/00* (2006.01)
*B01D 11/00* (2006.01)

(52) U.S. Cl.
CPC ........ *B01D 11/0226* (2013.01); *B01D 11/028* (2013.01); *B01D 11/0288* (2013.01); *B01D 2011/002* (2013.01); *B01D 2011/007* (2013.01)

(58) Field of Classification Search
CPC ............ B01D 11/0203; B01D 11/0403; B01D 11/0292
USPC ................................ 422/256, 261–262, 292
See application file for complete search history.

(56) References Cited

U.S. PATENT DOCUMENTS

| | | | |
|---|---|---|---|
| 2,199,670 A * | 5/1940 | Lowry | B01D 11/0226 210/179 |
| 7,622,140 B2 | 11/2009 | Whittle et al. | |
| 10,428,040 B2 | 10/2019 | Dijkstra | |
| 10,456,708 B2 | 10/2019 | Thomas | |
| 2010/0227042 A1 | 9/2010 | Penet et al. | |
| 2012/0063969 A1* | 3/2012 | Cornish | B01D 11/0284 422/261 |
| 2016/0243460 A1 | 8/2016 | Leveson et al. | |
| 2016/0250564 A1 | 9/2016 | Thomas | |
| 2018/0078874 A1 | 3/2018 | Thomas | |

FOREIGN PATENT DOCUMENTS

| | | |
|---|---|---|
| CN | 103387878 | 11/2013 |
| GB | 635121 | 4/1950 |
| WO | WO 2018/130682 | 7/2018 |

OTHER PUBLICATIONS

Casano et al., "Variations in terpene profiles of different strains of *Cannabis sativa* L," Acta horticulturae, vol. 925, Dec. 2011, pp. 115-121.
Elzinga et al., "Cannabinoids and terpenes as chernotaxonomic markers in cannabis," Natural Products Chemistry and Research, vol. 3, No. 4, Jul. 2015, 9 pages.

(Continued)

*Primary Examiner* — Monzer R Chorbaji
(74) *Attorney, Agent, or Firm* — Sheridan Ross P.C.

(57) ABSTRACT

Novel thermal evaporative processes for the recovery of heat-sensitive constituents, raw essential oil concentrates, and other compounds from plant biomass material are disclosed, as are systems for implementing such processes. Particularly, the processes include a solvent-less process for either batch-wise or continuous removal and recovery of refined oils, such as volatile aroma components and heavier oils, from plant material.

18 Claims, 4 Drawing Sheets

(56) References Cited

OTHER PUBLICATIONS

International Search Report and Written Opinion for International (PCT) Patent Application No. PCT/US2019/065498, dated Feb. 12, 2020, 10 pages.
International Search Report and Written Opinion for International (PCT) Patent Application No. PCT/US2019/065500, dated Feb. 25, 2020, 9 pages.

* cited by examiner

SYSTEMS, METHODS, AND EQUIPMENT FOR CHEMICAL EXTRACTION

FIELD OF THE INVENTION

The present invention relates generally to a novel thermal evaporative process for the recovery of heat-sensitive constituents, raw essential oil concentrates, and other compounds from plant biomass material, and particularly to a solvent-less process for either batch-wise or continuous removal and recovery of refined oils, such as volatile aroma components and heavier oils, from plant material.

BACKGROUND OF THE INVENTION

Current processes for the extraction of essential oils and volatile aroma components from plant and other biomass materials are typically batch processes that require a solvent, which is usually either a hydrocarbon-based solvent (e.g. an alcohol or butane) or a high-pressure (e.g. supercritical $CO_2$) gas. Systems employing these processes generally require specialized equipment and a carefully controlled process environment, as the hydrocarbon-based solvents are often highly flammable and any usage of high-pressure gases as solvents presents significant safety concerns. Products extracted from these solvent-based processes and systems frequently contain unwanted constituents and/or ballasts that harm the purity, odor, biocompatibility, and other characteristics of the extracted compounds. As a result, the products generally require additional processing, especially purification and solvent clean-up/recovery, downstream of the extraction process.

The following references generally relate to chemical extraction processes and are incorporated herein by reference in their entireties:

British Patent 635,121, entitled "Improvements in or relating to the preparation of extracts from aromatic plants," issued 5 Apr. 1950 to Germinal S.A.

U.S. Pat. No. 7,622,140, entitled "Processes and apparatus for extraction of active substances and enriched extracts from natural products," issued 24 Nov. 2009 to Whittle et al. ("Whittle").

S. Casano et al., "Variations in terpene profiles of different strains of *Cannabis sativa* L.," 925 *Acta Horticulturae* 115 (December 2011).

S. Elzinga et al., "Cannabinoids and terpenes as chemotaxonomic markers in *Cannabis*," 3 *Natural Products Chemistry & Research* 181 (July 2015) ("Elzinga").

Previous methods and systems, including but not limited to those disclosed in Whittle, have attempted to overcome the above-identified limitations. However, these attempts have their own drawbacks; the methods of Whittle, for example, are suitable for extraction of target compounds only at atmospheric or elevated pressures. The 1950 British patent issued to Germinal S.A. details a process, operable only as a batch process, to extract only volatile compounds by condensing them using intense heat and then intense cold, with intended uses for coffee and tea plant extracts.

There is therefore a need in the art for methods and systems for extracting chemical compounds from plant and other biomass materials continuously that eliminate any requirement for hydrocarbon or gaseous solvents or extreme operating temperatures that may damage temperature-sensitive constituents. It is advantageous for such methods and systems to be simpler and safer than present solvent-based methods and systems while simultaneously producing high-purity extracts without requiring further downstream processing. It is further advantageous for such methods and systems to be operable in either a continuous mode or a batch mode, at sub-atmospheric pressures that allow a reduced operating temperature to protect heat-sensitive constituents.

SUMMARY OF THE INVENTION

It is one aspect of the present invention to provide a method for extracting at least one chemical compound from plant material, comprising a) preparing a feedstock by at least one of chopping, cutting, treating, pelletizing, and grinding the plant material; b) preheating the feedstock to a first temperature at atmospheric or sub-atmospheric pressure for a preselected time to form a preheated feedstock; c) heating the preheated feedstock to a second temperature at sub-atmospheric pressure in an evaporation chamber to form a heated feedstock; d) flowing a heated motive gas through the evaporation chamber to drive the at least one chemical compound from the heated feedstock, thereby forming a pregnant motive gas; and e) condensing a portion of the pregnant motive gas to recover the at least one chemical compound.

In embodiments, the plant material may comprise a plant of the genus *Cannabis*.

In embodiments, the first temperature may be at least about 110° C.

In embodiments, the first time may be between about 10 minutes and about 120 minutes.

In embodiments, the second temperature may be between about 120° C. and about 200° C. In embodiments, the second time may be between about 20 minutes and about 200 minutes. In embodiments, the motive gas may comprise a non-oxidizing gas. The motive gas may, but need not, comprise at least one gas selected from the group consisting of helium, argon, an inert gas other than helium and argon, air, nitrogen, $CO_2$, and superheated steam.

In embodiments, a temperature of the heated motive gas in step d) may be between about 120° C. and about 250° C.

In embodiments, the at least one chemical compound may comprise at least one cannabinoid.

In embodiments, the at least one chemical compound may comprise at least one terpene or terpenoid.

It is another aspect of the present invention to provide a system for extracting at least one chemical compound from plant material, comprising a feedstock preparation unit, configured to size-reduce the plant material by at least one of chopping, cutting, grinding, and shredding to form a feedstock; a preheater, configured to receive the feedstock from the feedstock preparation unit and heat the feedstock at sub-atmospheric or atmospheric pressure to drive off moisture and low-boiling volatile components to form a preheated feedstock; a vacuum evaporator, configured to receive the preheated feedstock from the preheater; a means for delivering a motive gas to the evaporator to form a pregnant motive gas; and a recovery unit, configured to receive the pregnant motive gas from the evaporator and to condense the pregnant motive gas to recover the at least one chemical compound.

In embodiments, the pressures in the preheater and the vacuum evaporator may both be between about 0.02 inHg absolute and about 14 inHg absolute.

In embodiments, the system may be configured to drive a first chemical compound from the feedstock in the preheater and a second chemical compound from the preheated feedstock in the vacuum evaporator, and to recover the first and second chemical compounds in the recovery unit.

It is another aspect of the present invention to provide a system for extracting at least one chemical compound from plant material, comprising a feedstock preparation unit, configured to size-reduce the plant material to form a feedstock; a preheater, configured to receive the feedstock from the feedstock preparation unit and heat the feedstock at sub-atmospheric or atmospheric pressure to drive off moisture and low-boiling volatile components to form a preheated feedstock; a means for delivering a motive gas to the preheater to form a first pregnant motive gas; a first recovery unit, configured to receive the first pregnant motive gas from the preheater and condense the pregnant motive gas to recover moisture and low-boiling volatile components; a vacuum evaporator, configured to receive the preheated feedstock from the preheater; a means for delivering a motive gas to the evaporator to form a second pregnant motive gas; and a second recovery unit, configured to receive the second pregnant motive gas from the evaporator and to condense the second pregnant motive gas to recover the at least one chemical compound.

In embodiments, the pressure in the preheater may be about atmospheric pressure and the pressure in the vacuum evaporator may be between about 0.02 inHg absolute and about 14 inHg.

In embodiments, the system may be configured to drive a first chemical compound from the feedstock in the preheater and collect the first chemical compound in the first recovery unit, and to drive a second chemical compound from the preheated feedstock in the vacuum evaporator and collect the second chemical compound in the second recovery unit.

It is another aspect of the present invention to provide a continuous method for extracting a chemical compound from solid plant material, comprising a) providing a continuous flow of solid plant material; b) contacting the solid plant material with a non-oxidizing motive gas stream at sub-atmospheric pressure to form a pregnant motive gas comprising the chemical compound; and c) condensing the chemical compound from the pregnant motive gas.

It is another aspect of the present invention to provide a concentrated cannabinoid oil, comprising at least about 80 wt % cannabinoids, wherein the cannabinoid composition is substantially free of chlorophyll and waxes.

While specific embodiments and applications of the present invention have been illustrated and described, it is to be understood that the invention is not limited to the precise configuration and components described herein. Various modifications, changes, and variations which will be apparent to those skilled in the art may be made in the arrangement, operation, and details of the methods and systems of the present invention disclosed herein without departing from the spirit and scope of the invention. It is important, therefore, that the claims be regarded as including any such equivalent construction insofar as they do not depart from the spirit and scope of the present invention.

The advantages of the present invention will be apparent from the disclosure contained herein.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The embodiments and configurations described herein are neither complete nor exhaustive. As will be appreciated, other embodiments of the invention are possible utilizing, alone or in combination, one or more of the features set forth above or described in detail below.

DETAILED DESCRIPTION OF THE INVENTION

Figure 1:
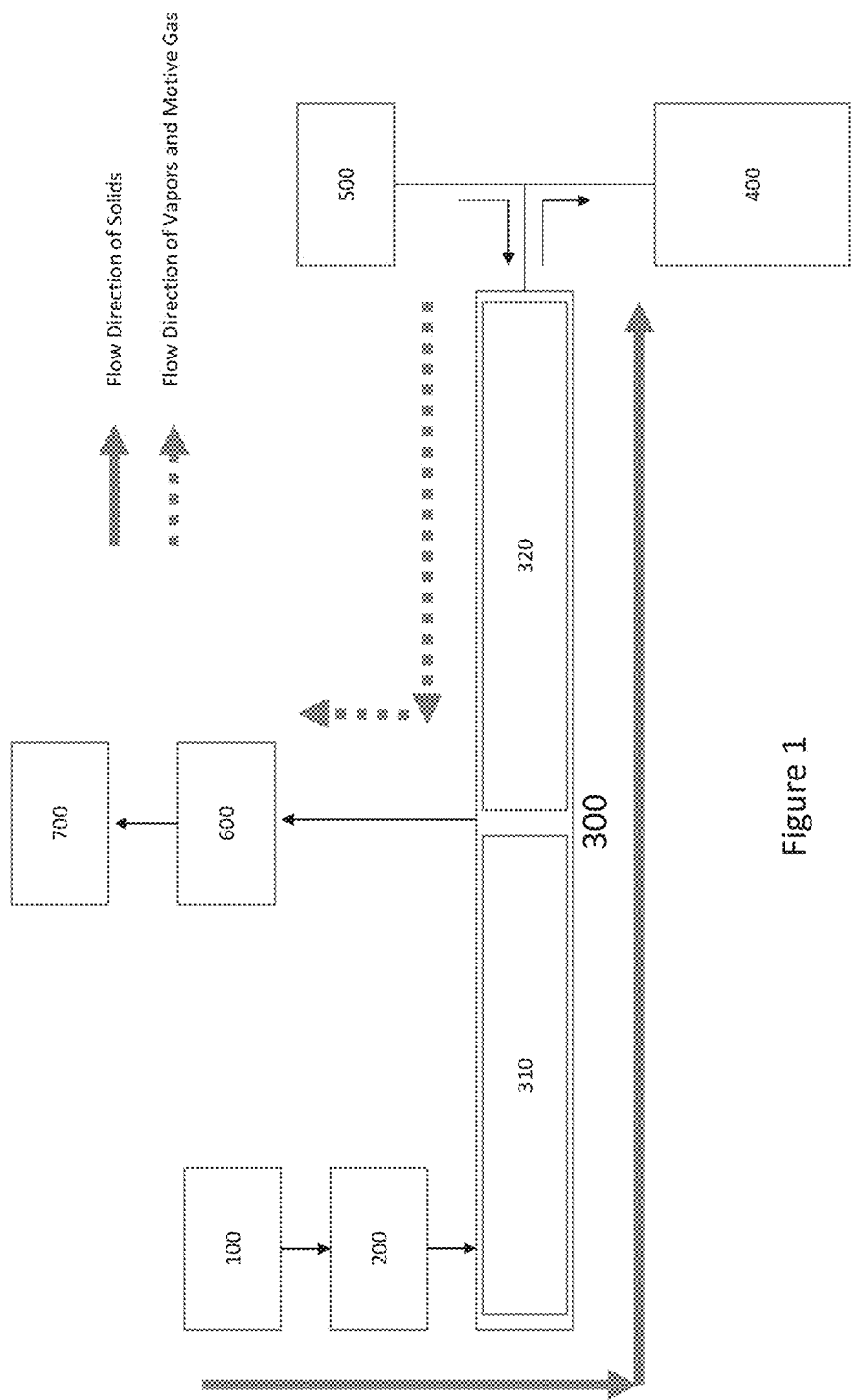
FIG. 1 is a generalized flowchart illustrating a laboratory-scale method for extraction of target compounds from plant material at biomass feed rates of up to a few hundred pounds per day, according to embodiments of the present invention.

As used herein, unless otherwise specified, the term "feedstock" refers to size-reduced plant material. By way of non-limiting example, chopped, cut, or ground *Cannabis* plants constitute a *Cannabis* feedstock within the meaning of the present application.

As used herein, unless otherwise specified, the term "plant material" refers to whole plants and/or parts of plants that contain one or more compounds to be extracted, including but not limited to aerial parts, leaves, stems, flowering heads, fruits, and/or roots. "Plant material" may be freshly harvested plants or parts of plants, plants or parts of plants that have been subjected to one or more pre-treatment steps (e.g. drying, removal of debris, etc.), and/or plants or parts of plants that have been frozen or pelletized.

As used herein, unless otherwise specified, the term "treating," when applied to plant material, refers to biomass surface digestion processes, i.e. processes in which at least a portion of a surface of the plant material is digested, disrupted, or dissolved, either chemically or physically. A plant material that has been subjected to a surface digestion process, e.g. using acid, caustic chemicals, or other chemical processes, or using physical disruption, is thus a "treated" plant material.

Although the following description generally refers to embodiments in which the methods and systems of the invention are employed to extract, e.g., cannabinoids from, e.g., *Cannabis*, it is to be expressly understood that the present invention may be suitably applied to any plant or other biomass material to extract any compound that may be obtained by distillation. By way of non-limiting example, the present invention may be employed to extract essential oils or other volatile compounds from spices, fruits, flowers, or any other suitable plant material, as such embodiments are within the scope of the present invention.

Methods of extracting a target compound from plant material according to the present invention generally comprise coarsely chopping, cutting, or grinding plant material; preheating the feedstock under atmospheric or sub-atmospheric pressure to drive off moisture and collect volatile compounds having a relatively low boiling point (e.g. terpenes); subsequently subjecting the feedstock to a flow of a motive gas, and optionally further heating the feedstock to collect volatile compounds having a relatively high boiling point (e.g. cannabinoids); and condensing the collected volatile compounds to form one or more extract products. The methods exhibit advantageous efficiency and selectivity as compared to prior art methods of solvent extraction, especially in relation to the isolation of high-purity, cannabinoid-rich fractions, which in embodiments may contain over 80% total cannabinoids, from *Cannabis* plant material. The methods may be operated in either a batch mode or a continuous mode and are therefore particularly suitable for use in large-scale commercial production of extracts from natural products.

Plant material for use in the present invention may be, by way of non-limiting example, whole plants, aerial parts, leaves, stems, flowering heads, fruits, and/or roots, and may be freshly harvested, dried, frozen and/or pelletized. When using freshly harvested plant material, e.g. plant material that is still green, the methods of the invention may advantageously include a pre-treatment step in which the plant material is dried to remove water vapor therefrom.

The temperature of the motive gas used to volatilize compounds having relatively high boiling points, e.g. cannabinoids, may vary depending on the nature of the plant material and the target compounds. In embodiments, the temperature will generally be selected to avoid pyrolysis of the plant material or degradation of any target compounds contained therein. Motive gas temperatures typical of embodiments of the present invention may be between about 120° C. and about 250° C. Certain steps of the methods of the invention are advantageously carried out at sub-atmospheric pressure, and in some embodiments absolute vacuum or near-vacuum.

Motive gases suitable for use in the process may include warm or hot air. However, for cases where oxidative degradation of constituent compounds of the produced extract may be a concern, the use of a non-oxidizing gas instead may be desirable. Examples of non-oxidizing gases include but are not limited to $CO_2$, nitrogen, superheated steam, and inert gases such as helium and argon.

The temperature of the extraction steps may be varied over the course of the extraction process. In embodiments, two or more discrete temperature steps may be used. Where multiple temperature steps are used, it is generally desirable that the temperature be increased at each step. The use of two or more discrete temperatures may be beneficial where, by way of non-limiting example, it is desired to extract two or more target compounds of different boiling points.

The present inventors have found that heating the feedstock may also encourage desirable chemical reactions of the constituent compounds present in the feedstock. By way of non-limiting example, the principal active constituents of *Cannabis sativa* and *Cannabis indica* are the cannabinoids; tetrahydrocannabinol (THC) and cannabidiol (CBD) are the most common cannabinoids, but others (e.g. cannabigerol (CBG) and cannabichromene (CBC)) are often present in smaller quantities and may be desirable in certain applications. The bulk of the cannabinoids present in the *Cannabis* plant are present not in free or neutral form but as their corresponding carboxylic acids, which typically exhibit little or no biological activity. Thus, it is necessary to convert the cannabinoid carboxylic acids into their corresponding free cannabinoids before extraction; prior art methods have generally accomplished this decarboxylation by preheating in a separate step.

The present inventors have found that by extracting cannabinoids from *Cannabis* at elevated temperatures (e.g. between about 120 and about 200° C.) for a suitable period of time (e.g. between about 20 and about 200 minutes), the cannabinoid carboxylic acids may be converted into free cannabinoids without the need for a separate decarboxylation step. In other words, decarboxylation and evaporation of the cannabinoids may be accomplished simultaneously in a single step by heating the feedstock under atmospheric or sub-atmospheric pressure. For this reason, methods of the present invention are particularly suitable for preparing extracts of *Cannabis*.

Preferred temperatures and times for the heating steps of the methods of the present invention may vary according to the particular cannabinoids or other compounds that are to be extracted, as well as the consideration of running the process in a batch mode or a continuous mode. By way of non-limiting example, certain chemotypes of *Cannabis* express a high proportion of their total cannabinoid content as THC, or as CBD. Where a CBD-rich extract is to be produced from a *Cannabis* plant high in CBD, an extraction temperature may be selected to prevent thermal oxidation of CBD to $\Delta^8$-THC, $\Delta^9$-THC and other degradation products. In the case of THC-rich feedstocks, operating temperatures should be selected to limit the conversion of $\Delta^9$-THC to $\Delta^8$-THC and cannabinol (CBN).

As discussed below, these temperatures may be adjusted to produce extracts that are higher or lower in compounds having higher or lower boiling points; by way of non-limiting example, where a *Cannabis* extract high in cannabinoids and low in terpenes is desired, a somewhat higher temperature may be used to drive off the more volatile terpenes and preserve the cannabinoids. Other factors, including but not limited to the flow rate of the feedstock and/or motive gas, residence time, the choice of batch versus continuous processing, and the condensation conditions, may affect the preferred extraction temperature and time.

Another advantage of the present invention in relation to the production of cannabinoid-rich extracts is that the extracts are characterized by a high degree of purity of the free cannabinoids and heavy terpenes, and in many embodiments are substantially free of waxes, sterols, and other lipid-soluble compounds that are common in extracts produced by the solvent-based methods and $CO_2$ systems of the prior art. By way of non-limiting example, the relatively selective $CO_2$ extraction processes of the prior art typically yield extracts that are about 65 wt % cannabinoid, whereas the present invention is suitable for producing extracts of at least about 80 wt % cannabinoid, and as much as about 90 wt % cannabinoid, particularly from relatively cannabinoid-rich feedstocks. When relatively cannabinoid-poor feedstocks are used, the obtained composition may represent a mixture of at least about 80 wt % combined cannabinoids and terpenes/terpenoids. The methods and systems of the present invention thus exhibit significantly increased selectivity for cannabinoids relative to the methods and systems of the prior art.

Most of the undesired or waste mass/ballast of *Cannabis* plants consists of involatile material. The methods and systems of the present invention efficiently separate the desired active cannabinoids from this involatile ballast by volatilizing the cannabinoids, but not the ballast. Removal of waxes, sterols, chlorophyll or other involatile waste material from the extract is thus much easier with the current invention than with prior art processes, as the methods described herein circumvent the downstream processes made necessary by previous techniques.

Besides cannabinoids and involatile waste material, most of the chemical composition of *Cannabis* consists of volatile monoterpenes and less volatile sesquiterpenes. Depending on the desired composition of the *Cannabis* extract, it may be advantageous to separate and discard the monoterpenes, or separate and retain the monoterpenes as a secondary extract product, or retain the monoterpenes and sesquiterpenes cannabinoids together in a single extract product. Often, separation of these terpenes from a cannabinoid extract is desirable because it is believed that certain terpene compounds may adversely affect the stability of the cannabinoids in the extract. In such embodiments, methods and systems of the present invention may use a single-step temperature profile to produce a cannabinoid-rich extract substantially free of volatile terpenes, wherein the majority of the cannabinoids are present in the biologically active free or neutral form rather than as their naturally occurring carboxylic acids; as a result, neither a separate decarboxylation step (to convert the cannabinoids to the free form) nor a separate "winterization" step (to remove terpenes and other undesired compounds) is necessary, representing a clear advantage over methods and systems of the prior art.

Another advantage of methods and systems of the present invention is that *Cannabis* extracts produced by the present invention contain a blend of cannabinoids in approximately the same proportion as are present in the raw *Cannabis* plant material. In other words, little or no fractionation of cannabinoids may be observed so a "Full Spectrum" product is produced that reflects the cannabinoid profile of the feedstock.

It may be advantageous to process high-THC and high-CBD chemotypes of *Cannabis* separately to produce extracts rich in CBD or THC respectively, from which mixtures containing desired concentrations of THC and/or CBD can be made.

The present invention provides apparatuses and systems for extracting target compounds from plant material without the use of a hydrocarbon-derived, alcohol, or $CO_2$ solvents. The apparatuses and systems generally comprise a pretreatment unit, wherein chopped, cut, pelletized, or ground plant material; a hopper, dispensing the feedstock; a preheater, configured to drive off moisture from the feedstock and optionally collect volatile compounds having a relatively low boiling point; an evaporator wherein a motive gas flows to the feedstock, and the feedstock is optionally further heated, to collect volatile compounds having a relatively high boiling point; and a vapor recovery units, wherein one or more plant extracts are condensed.

Figure 2:
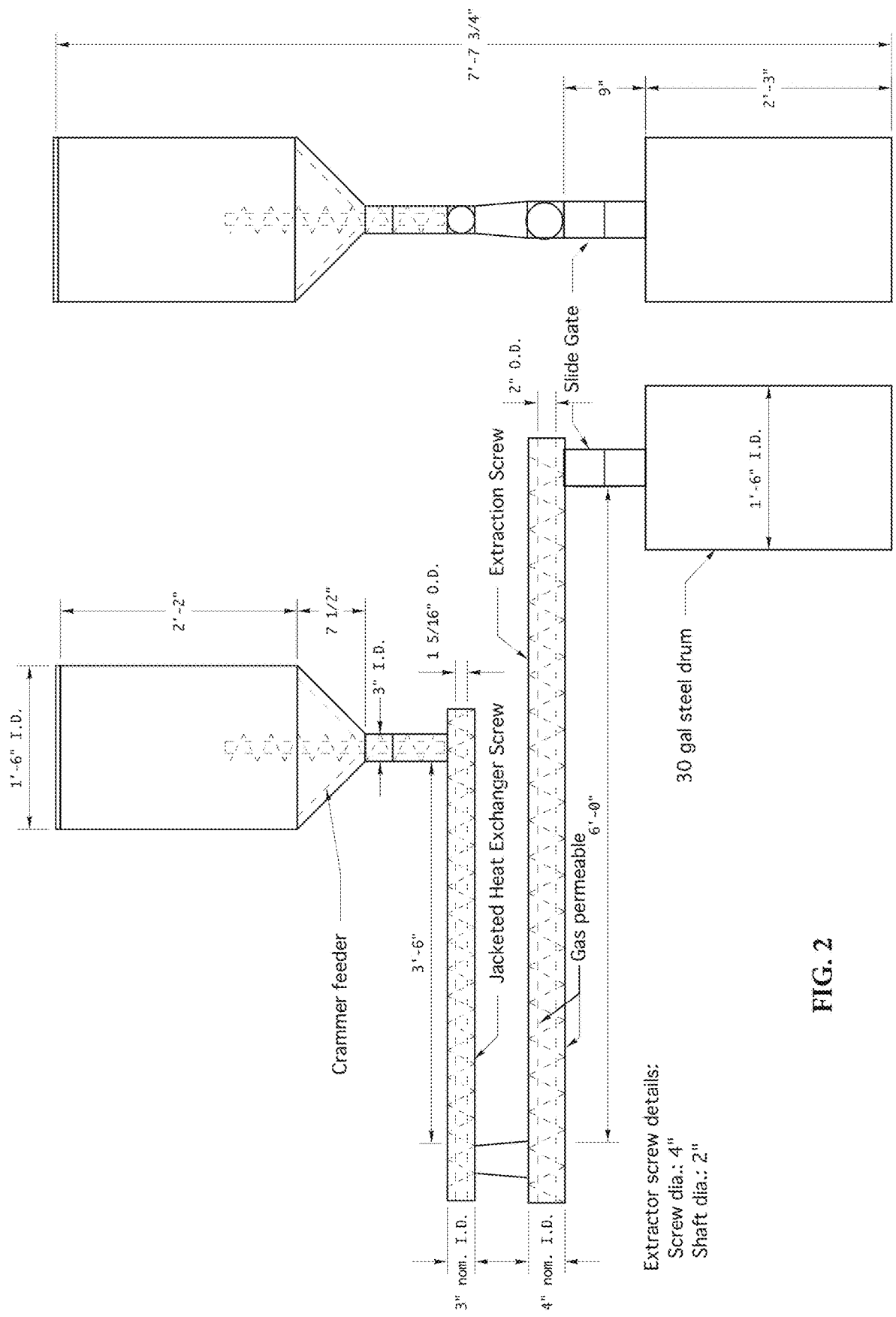
FIG. 2 is a schematic of a laboratory-scale system for extraction of target compounds from plant material, according to embodiments of the present invention.

Referring now to FIGS. 1 and 2, plant material is first placed in a feedstock preparation unit 100. In feedstock preparation unit 100, the plant material is first chopped, cut, or ground to increase the surface area of the plant material for subsequent processing. In contrast to the methods and systems of the prior art, the plant material need not be finely ground, and in fact it may be desirable in some embodiments for the plant material to contain minimal fines; a coarse chop, grind, or shred, e.g. passing between a 40-mesh and 0.25" sieve, is sufficient, but may require more specification depending on the nature of the plant material itself.

In addition to the above-described aspects of the feedstock preparation unit 100, the unit may optionally comprise various further operations. By way of non-limiting example, additional cleansing agents, e.g. surface-active agents, natural catalysts and/or enzymes, and caustic or acidic chemicals, may be applied to the plant material; the plant material may be subjected to attritioning, steam explosion or other quick pressure reduction, or microwave or ultrasonic treatment; and/or the feedstock may be additionally exposed to conventional extraction processes, such as extraction by hydrocarbon- or alcohol-based solvents or high-pressure $CO_2$, to make volatile constituents of the feedstock more available to downstream evaporation processes.

The feedstock is then passed to a feed hopper 200. The hopper 200 is integrally interconnected to downstream operation units and is fitted with a double dump valve, rotary valve, or similar apparatus to maintain atmospheric to sub-atmospheric pressures, in some embodiments between about 2 inHg and about 14 inHg, while continuously feeding the downstream operation units. The hopper 200 is preferably configured, e.g. by outlet size, wall steepness, low-friction construction, etc., to ensure that a stable rathole or arch does not develop and impede the flow of feedstock. The hopper 200 may optionally comprise a rotary valve or screw to feed the feedstock to downstream operation units; when present, the screw of the hopper 200 preferably has a stepped or tapered shaft section, and optionally an increasing pitch section, to ensure reliable flow of the feedstock, especially where the outlet of the hopper 200 is a slot. The hopper 200 may optionally comprise additional components, e.g. a removable lid to reduce leakage of air.

From the feed hopper 200, the feedstock is conveyed (by a pneumatic conveyance, gravity, auger, plunger, or other means of positive displacement transport) to an evaporator 300, which in the embodiment illustrated in FIG. 1 comprises two stages: a preheater and/or Low-Temperature Evaporator 310, and a high-temperature evaporator 320. In embodiments, the low-temperature evaporator 310 may comprise a screw-type or tube-in-tube heat exchanger, wherein the feedstock is conveyed along a length of the heat exchanger through a heated trough by a screw. The screw may or may not be heated. In other embodiments, the low-temperature evaporator 310 may comprise a moving bed heat exchanger, wherein material flows by gravity between heated plates. Where a screw-type heat exchanger is used, the screw preferably has the same diameter as an outlet of the feed hopper 200. The low-temperature evaporator 310 is preferably maintained at a temperature of at least about 110° C., and at sub-atmospheric pressures (preferably between about 0.02 inHg absolute and about atmospheric pressure), to assist in driving off moisture and volatile compounds having relatively low boiling points; vapors of these volatile constituents then exit through a gas exhaust port.

As the feedstock, now dried and partially devolatilized, exits the low-temperature evaporator 310, it enters the high-temperature evaporator 320. The high-temperature evaporator 320 comprises a screw with a gas-permeable shaft, a gas-permeable cylindrical trough, and a gas-impermeable cylinder. The gas-impermeable cylinder surrounds and has a larger diameter than the gas-permeable cylindrical trough, thereby forming an annular space between the gas-permeable cylindrical trough and the gas-impermeable cylinder. The high-temperature evaporator 320 is maintained at sub-atmospheric pressure, preferably between about 0.02 inHg absolute and about 14 inHg absolute, and is heated or insulated to maintain a desired extraction temperature, most typically between about 120° C. and about 200° C. A heated motive gas (also referred to as a stripping gas) is injected into the high-temperature evaporator 320 and drawn through the evaporator by a vacuum pump 700. Flow of the motive gas through the high-temperature evaporator 320 may be any combination of co-current with, counter-current to, and/or cross-current to the flow of the feedstock and may have any suitable flow rate, which in typical embodiments may (but need not) be between about 0.10 and about 40 standard liters per minute for every pound per hour of solid feed material; more generally, a ratio of the flow rate of the heated motive gas to the flow rate of the feedstock may be between about 1 standard liter per pound and about 12,000 standard liters per pound, or between about 6 standard liters per pound and about 2,400 standard liters per pound. In this way, volatilizable compounds having a relatively high boiling point, e.g. THC, present in the feedstock are efficiently extracted from the feedstock and carried out of the high-temperature evaporator 320 by the motive gas. As described above, the motive gas may be any suitable gas, including but not limited to an inert gas (helium, argon, etc.), air, $CO_2$, nitrogen, superheated steam, etc., and may preferably be a non-oxidizing gas.

The high-temperature evaporator 320 may, in operation, be substantially or completely filled with feedstock material, or it may be partially filled, at least in a portion, by increasing the pitch of the screw. Lifters or paddles may be installed in appropriate portions of the high-temperature evaporator 320 to promote mixing and movement of the feedstock. Alternatively, a gravity moving bed extractor, wherein the motive gas passes cross-currently between parallel gas-permeable plates, may be employed. The solids exit port of the high-temperature evaporator 320 also typically comprises a rotary air lock, slide gate valve, or double dump valve to form a seal between the high-temperature evaporator 320 and downstream operational units.

In preferred embodiments, the gas-permeable cylindrical trough constitutes an inner "shell" of the high-temperature evaporator 320, wherein the inner shell rotates on an auger. Blades of the auger may be disposed on the inner shell, promoting motion of the feedstock through the high-temperature evaporator 320. The gas-impermeable cylinder thus constitutes the outer "shell" of the high-temperature evaporator 320 to define the annular space within the evaporator, and may comprise a gas exhaust port, preferably near a longitudinal center of the high-temperature evaporator 320, through which the motive gas and the extracted compounds exit the evaporator.

In embodiments, the motive gas may be introduced into the high-temperature evaporator 320 by a small-diameter gas dispersion membrane, which may (but need not) be mounted to an auger to transport the motive gas through the high-temperature evaporator 320, and a larger-diameter gas dispersion membrane may be positioned about the auger to provide cross-flow contact of the motive gas with the feedstock, thus allowing for pregnant motive gas containing the evaporated product materials to be collected in a void and/or annular space.

After passing through the high-temperature evaporator 320, the remnants of the feedstock (e.g. dried and substantially or completely devolatilized plant material) is discharged into a spent residue collection tank 400.

The system may also comprise means 500 for metering and/or heating the motive gas, which may in embodiments comprise at least one of a gas generation system (e.g. steam boiler or nitrogen generator), a gas metering device, and a gas heater/temperature controller.

The motive gas and volatile compounds extracted from the feedstock exit the high-temperature evaporator 320 via the exhaust port and are then passed to a vapor recovery module 600. The vapor recovery module 600 typically comprises a coiled tube-in-tube heat exchanger, whereby the volatile compounds are condensed. The volatile compounds may condense and coalesce directly on a surface of the heat exchanger, and then drip into, precipitate into, or otherwise be collected in an extract collection vessel. The present inventors have surprisingly found that the process gases and vapors condensed and collected in this way can, in suitable embodiments, coalesce with minimal pressure loss. Optionally, remaining extraction products (e.g. monoterpenes and lighter sesquiterpenes) may be recovered in a separate cryogenic bath of the vapor recovery module 600. Additional coalescing, condensing, phase separation, and recovery techniques may also be employed, including but not limited to liquid-phase recovery, cyclone recovery, and demisting operations.

The motive gas and unrecoverable volatile products are pulled via the vacuum pump 700 out of the recovery module 600 to be recycled, remediated, separated, further processed, and/or vented to the atmosphere. The vacuum pump 700 may also be used to provide suitable sub-atmospheric pressures in any one or more other components of the system, including but not limited to the preheater and/or low-temperature evaporator 310 and/or the high-temperature evaporator 320.

Figure 3:
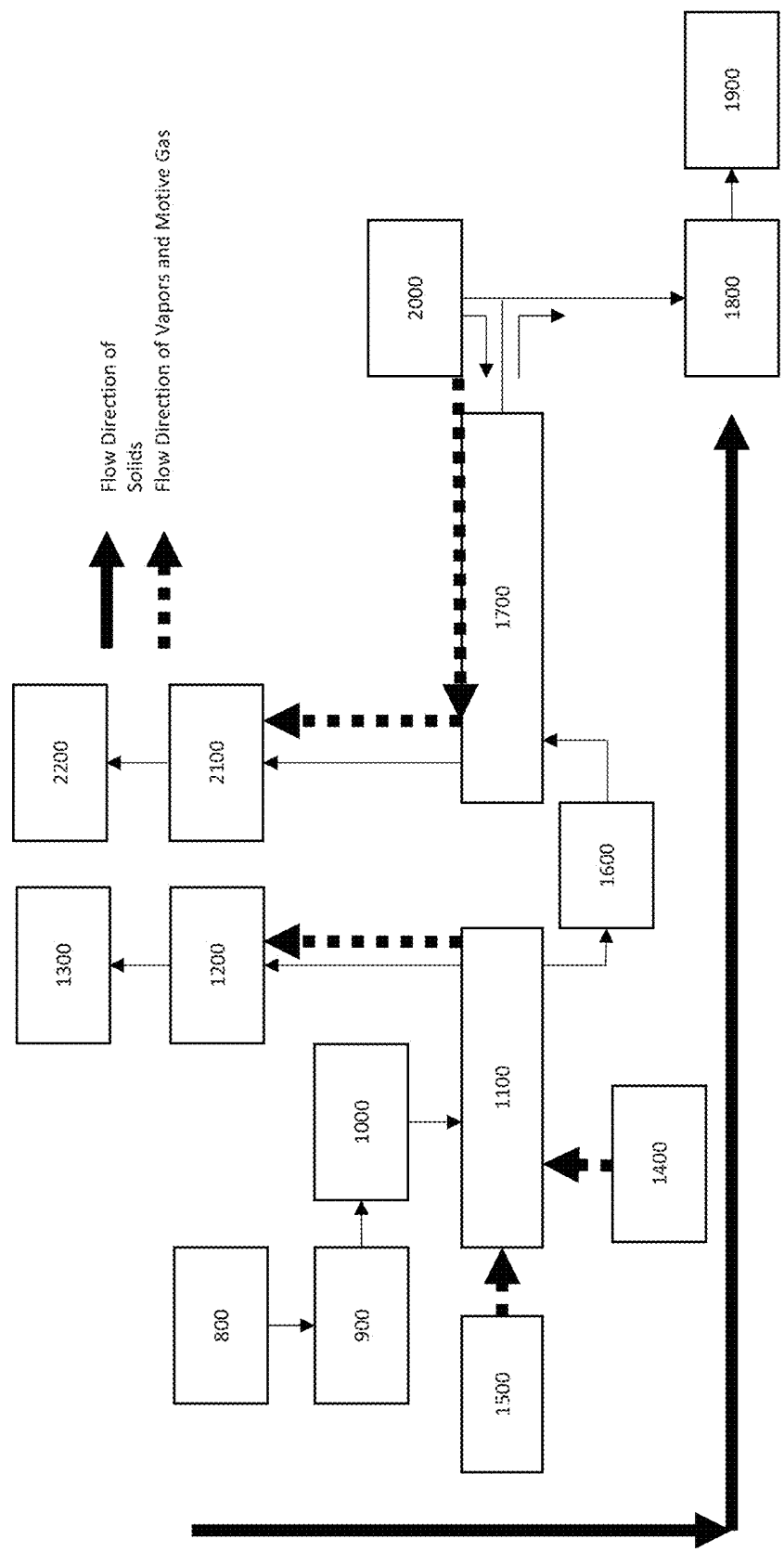
FIG. 3 is a schematic of a system for the extraction of targeted compounds from plant material operable to process larger quantities of biomass on the order of multiple tons per day, according to embodiments of the present invention.

Referring now to FIG. 3, another extraction system according to embodiments of the present invention is illustrated. In the system illustrated in FIG. 3, plant material is first placed in a feedstock preparation unit 800. In the feedstock preparation unit 800, the plant material is first chopped, cut, or ground to increase the surface area of the plant material for subsequent processing. It may be desirable in some embodiments for the plant material to contain minimal fines; a coarse chop, grind, or shred, e.g. passing between about a 40-mesh and a 0.25" sieve, is sufficient, but may require more specification depending on the nature of the plant material itself.

From the feedstock preparation unit 800, the feedstock is then passed to a feed hopper 900. The hopper 900 is integrally interconnected to downstream operation units and is fitted with a double dump valve, rotary valve, or similar apparatus to maintain sub-atmospheric or atmospheric pressures, in some embodiments between about 0.02 inHg absolute and about 30 inHg absolute, while continuously feeding the downstream operation units. The hopper 900 is preferably configured (e.g. by outlet size, wall steepness, low-friction construction, etc.) to ensure that a stable rathole or arch does not develop and impede the flow of feedstock. The feed hopper 900 may optionally comprise a screw to feed the feedstock to downstream operation units; when present, the screw of the hopper 900 preferably has a stepped or tapered shaft section, and optionally an increasing pitch section, to ensure reliable flow of the feedstock.

A first double dump valve or rotary valve 1000 pressure isolation valve system is positioned at the discharge of the hopper 900 to allow for the controlled flow of solids to a lower pressure vessel.

From the first double dump valve or rotary valve 1000, the treated feedstock is conveyed, e.g. by gravity, to a preheater and/or low-temperature evaporator 1100, where the feedstock is dried to a moisture content of less than about 1 wt % and low-boiling point terpenes are evaporated from the solids. The heat transfer mechanism employed by the low-temperature evaporator 1100 may be direct (contact with heated gas), indirect (conductive contact with heated surfaces), radiant (no direct contact between the heated surface and solids), microwave, or any combination of these mechanisms.

In one embodiment, the low-temperature evaporator 300 system illustrated in FIGS. 1 and 2, which employs direct, indirect, and radiant heat transfer mechanisms, may be employed as the low-temperature evaporator 1100 illustrated in FIG. 3. Variants or modified commercial solids drying processes such as thin-film, tray, vacuum paddle, and purge column dryers may also be used as a low-temperature evaporator system 1100. In operation, the low-temperature evaporator 1100 is preferably maintained at a temperature of at least about 110° C., and at atmospheric to sub-atmospheric pressures.

In sub-atmospheric operations, a gas circuit of the low-temperature evaporator 1100 is fitted with a first vacuum pump 1300 to provide a pressure differential for the flow of motive gas through the low-temperature evaporator 1100. When operating at atmospheric or higher pressures, a blower 1500 is placed upstream of the low-temperature evaporator 1100 to provide a driving force for the motive gas through the system. At a higher operating pressure, a recycle stream can be added to the motive gas circuit for the recovery of lean process gas and to reduce demand from gas production systems.

A heated motive gas is injected into the low-temperature evaporator 1100 through a first motive gas production module 1400 to assist in driving off moisture and lower-molecular weight volatile compounds having relatively low boiling points; these compounds may include monoterpenes and certain sesquiterpenes. The temperature of gas from the first motive gas production module 1400 is preferably between about 120° C. and about 250° C. The motive gas preferably comprises a non-oxidizing gas, which may be selected from the group consisting of nitrogen, steam, helium, argon, an inert gas other than helium and argon, air, carbon dioxide, and steam. A gas-generating utility, such as a steam boiler or nitrogen generator (PSA- or membrane-based) may be included in the first motive gas production module 1400.

The pregnant motive gas containing moisture and the light terpenes (e.g. mono- and sesquiterpenes) exits the low-temperature evaporator 1100 through a gas exhaust port and is directed to a first vapor recovery unit 1200. The first vapor recovery unit 1200 typically comprises a coiled tube-in-tube heat exchanger and/or a cold finger condenser, whereby water and volatile compounds are condensed. Additional coalescing, condensing, phase separation, and recovery techniques may also be employed, including but not limited to liquid-phase recovery, cyclone recovery, and demisting operations.

In sub-atmospheric pressure operations, the motive gas and unrecoverable volatile products are pulled via the first vacuum pump 1300 out of the first vapor recovery unit 1200 and vented to the atmosphere or recycled back to the motive gas circuit. When operating at ambient and higher pressures, the blower 1500 is placed upstream of the low-temperature evaporator 1100 to provide a driving force for motive gas through the system.

Feedstock from the low-temperature evaporator 1100, now dried and partially devolatilized and heated to at least about 140° C., is discharged into a second double dump, rotary valve, or pressure isolation valve system 1600. From the second valve system 1600, the solids are metered into the high-vacuum environment of a high-temperature, low-pressure evaporator 1700.

In some embodiments, a high-temperature evaporator 320 as illustrated in FIG. 1 may be employed as the high-temperature evaporator 1700 illustrated in FIG. 3. The high-temperature evaporator 1700 is comprised of a screw with a gas-permeable shaft, a gas-permeable cylindrical trough, and a gas-impermeable cylinder. The gas-impermeable cylinder surrounds the gas-permeable cylindrical trough, and has a larger diameter that thereby forms an annular space between the gas-permeable cylindrical trough and the gas-impermeable cylinder. The high-temperature evaporator 1700 may, in operation, be substantially and/or completely filled with feedstock material, or it may be partially filled, at least in a portion, by increasing the pitch of the screw. Lifters or paddles may be installed in appropriate portions of the high-temperature evaporator 1700 to promote mixing and movement of the feedstock. The gas-permeable cylindrical trough constitutes an inner "shell" of, wherein the inner shell rotates on an auger. Blades of the auger may be disposed on the inner shell, promoting motion of the feedstock through the high-temperature evaporator 1700. The gas-impermeable cylinder thus constitutes the outer "shell" of the high-temperature evaporator 1700 to define the annular space within the high-temperature evaporator 1700, and may comprise a gas exhaust port, preferably near a longitudinal center of the high-temperature evaporator 1700, through which the motive gas and the extracted compounds exit the high-temperature evaporator 1700. Motive gas is introduced into the high-temperature evaporator 1700 by a small-diameter gas dispersion membrane, which may be mounted to an auger to transport the motive gas through the high-temperature evaporator 1700, and a larger-diameter gas dispersion membrane may be positioned about the auger to provide cross-flow contact of the motive gas with the feedstock, thus allowing for pregnant motive gas containing the evaporated product materials may be collected in a void and/or annular space.

Alternatively, the high-temperature evaporator 1700 may comprise a gravity moving bed extractor, wherein the motive gas passes cross-currently between parallel gas-permeable plates, or variants or modified commercial vacuum solids drying processes such as vacuum paddle dryers and purge columns.

The high-temperature, low-pressure evaporator 1700 is maintained at sub-atmospheric pressure, preferably between about 0.02 inHg absolute and about 14 inHg absolute, and is heated and/or insulated to maintain a desired solids bed temperature, most typically between about 120° C. and about 200° C. A heated motive gas (also referred to as a stripping gas) is injected into the high-temperature evaporator 1700 and drawn through the high-temperature evaporator by a second vacuum pump 2200; the flow of the motive gas through the high-temperature evaporator 1700 may be any combination of co-current with, counter-current to, and/or cross-current to the flow of the feedstock through the high-temperature evaporator 1700, and may have any suitable flow rate sufficient to evaporate volatilizable compounds having a relatively high boiling point, e.g. THC and other cannabinoids, present in the feedstock. As described above, the motive gas may be any suitable non-oxidizing gas, including but not limited to an inert gas (helium, argon, etc.), air, nitrogen, $CO_2$, and superheated steam.

After passing through the high-temperature evaporator 1700, the remnants of the feedstock, e.g. dried and substantially completely devolatilized plant material (spent residue), are discharged into a third double dump, rotary, or pressure isolation valve system 1800, and are subsequently metered into a spent residue collection tank 1900.

The motive gas for the high-temperature evaporator 1700 is generated, metered, and heated in a second motive gas production module 2000. The module may comprise a boiler to produce superheated steam, a nitrogen gas generator, and/or a natural gas combustor to generate a gas mixture of CO$_2$, nitrogen, and steam. After generation, the motive gas is sent through a pressure let-down valve or orifice and heated to at least about 120° C. before introduction to the high-temperature evaporator 1700. When a non-condensable gas such as CO$_2$ or nitrogen is used as the motive gas, the gas may be recycled from the vacuum pump exhaust stream to reduce demand on the gas production operation. When superheated steam is employed as the motive gas, process steam is condensed in the second vapor recovery module 2100, where the aqueous condensate is treated and recycled to the second motive gas production module 2000.

Pregnant process gas from the high-temperature evaporator 1700 containing steam, cannabinoids, sesquiterpenes, and noncondensable gases is directed to the second vapor recovery module 2100. The second vapor recovery unit 2100 typically comprises a coiled tube-in-tube heat exchanger, whereby the condensable cannabinoids and terpenes and moisture are condensed. Additional coalescing, condensing, phase separation, scrubbers and recovery techniques may also be employed, including but not limited to liquid-phase recovery, cyclone recovery, and demisting operations.

Surprisingly, the present inventors have found that the cannabinoids condense and coalesce directly on the surface of a tube-in-shell heat exchanger, and then drip by gravity into an extract collection chamber. Typically, the raw oil thus produced can contain approximately 80 wt % cannabinoids when produced from a cannabinoid-rich feedstock. The oil exhibits a "full-spectrum" quality, in which all cannabinoids present in the feedstock are present in similar ratios in the oil. Furthermore, the oil is generally substantially free of chlorophyll and waxes. The cannabinoid content of the raw oil can be increased by operating the high-temperature evaporator 1700 at full vacuum (i.e. zero or very near-zero absolute pressure) and increasing the temperature of the high-temperature evaporator 1700 to a range of between about 100° C. and about 120° C. to drive off residual moisture and light terpenes.

Noncondensable gases flow from the second vapor recovery unit 2100 collection system and to the second vacuum pump 2200. Exhaust from the second vacuum pump 2200 can be discharged to the atmosphere, treated with activated carbon, and/or flared to reduced emission particulate, mist, and odor.

Embodiments of the present invention may suitably be used to extract any one or more cannabinoids from *Cannabis* or other plant material. Cannabinoids amenable to extraction by embodiments of the present invention include, but are not limited to, cannabichromene-type (CBC) cannabinoids, e.g. (±)-cannabichromene (CBC-C$_5$), (±)-cannabichromenic acid A (CBCA-C$_5$ A), (±)-cannabichromevarin (CBCV-C$_3$), and (±)-cannabichromevarinic acid A (CBCVA-C$_3$ A); cannabichromanone-type (CBCN) cannabinoids, e.g. cannabichromanone (CBCN-C$_5$), cannabichromanone-C$_3$ (CBCN-C$_3$), and cannabicoumaronone (CBCON-C$_5$); cannabidiol-type (CBD) cannabinoids, e.g. (−)-cannabidiol (CBD-C$_5$), cannabidiol monomethyl ether (CBDM-C$_5$), cannabidiol-C$_4$ (CBD-C$_4$), (−)-cannabidivarin (CBDV-C$_3$), cannabidiorcol (CBD-C$_1$), cannabidiolic acid (CBDA-C$_5$), and cannabidivarinic acid (CBDVA-C$_3$); cannabielsoin-type (CBE) cannabinoids, e.g. (5aS,6S,9R,9aR)-cannabielsoin (CBE-C$_5$), (5aS,6S,9R,9aR)—C$_3$-cannabielsoin (CBE-C$_3$), (5aS,6S,9R,9aR)-cannabielsoic acid A (CBEA-C$_5$ A), (5aS,6S,9R,9aR)-cannabielsoic acid B (CBEA-C$_5$ B), (5aS,6S,9R,9aR)—C$_3$-cannabielsoic acid B (CBEA-C$_3$ B), cannabiglendol-C$_3$ (OH-iso-HHCV-C$_3$), dehydrocannabifuran (DCBF-C$_5$), and cannabifuran (CBF-C$_5$); cannabigerol-type (CBG) cannabinoids, e.g. cannabigerol ((E)-CBG-C$_5$), cannabigerol monomethyl ether ((E)-CBGM-C$_5$ A), cannabinerolic acid A ((Z)-CBGA-C$_5$ A), cannabigerovarin ((E)-CBGV-C$_3$), cannabigerolic acid A ((E)-CBGA-C$_5$ A), cannabigerolic acid A monomethyl ether ((E)-CBGAM-C$_5$ A), and cannabigerovarinic acid A ((E)-CBGVA-C$_3$ A); cannabicyclol-type (CBL) cannabinoids, e.g. (±)-(1aS,3aR,8bR,8cR)-cannabicyclol (CBL-C$_5$), (±)-(1aS,3aR,8bR,8cR)-cannabicyclolic acid A (CBLA-C$_5$ A), and (±)-(1aS,3aR,8bR,8cR)-cannabicyclovarin (CBLV-C$_3$); cannabinol-type (CBN) cannabinoids, e.g. cannabinol (CBN-C$_5$), cannabinol-C$_4$ (CBN-C$_4$), cannabivarin (CBN-C$_3$), cannabinol-C$_2$ (CBN-C$_2$), cannabiorcol (CBN-C$_1$), cannabinolic acid A (CBNA-C$_5$ A), and cannabinol methyl ether (CBNM-C$_5$); cannabinodiol-type (CBND) cannabinoids, e.g. cannabinodiol (CBND-C$_5$) and cannabinodivarin (CBND-C$_3$); cannabicitran-type or cannabitriol-type (CBT) cannabinoids, e.g. cannabicitran (CBT-C$_5$), (−)-(9R,10R)-trans-cannabitriol ((−)-trans-CBT-C$_5$), (+)-(9S,10S)-cannabitriol ((+)-trans-CBT-C$_5$), (±)-(9R,10S/9S,10R)-cannabitriol ((±)-cis-CBT-C$_5$), (−)-(9R,10R)-trans-10-O-ethyl cannabitriol ((−)-trans-CBT-OEt-C$_5$), (±)-(9R,10R/9S,10S)-cannabitriol-C$_3$ ((±)-trans-CBT-C$_3$), 8,9-dihydroxy-$\Delta^{6a(10a)}$-tetrahydrocannabinol (8,9-Di-OH-CBT-C$_5$), cannabidiolic acid A cannabitriol ester (CBDA-C$_5$ 9-OH-CBT-05 ester), cannabiripsol (cannabiripsol-C$_5$), (−)-6a,7,10a-trihydroxy-$\Delta^9$-tetrahydrocannabinol ((−)-cannabitetrol), and 10-oxo-$\Delta^{6a(10a)}$-tetrahydrocannabinol (OTHC); isocannabinoids, e.g. (−)-$\Delta^7$-trans-(1R,3R,6r)-isotetrahydrocannabinol, (±)-$\Delta^7$-1,2-cis-(1R,3R,6S/1S,3S,6R)-isotetrahydrocannabivarin, and (−)-$\Delta^7$-trans-(1R,3R,6R)-isotetrahydrocannabivarin; and tetrahydrocannabinol-type (THC) cannabinoids, e.g. $\Delta^9$-tetrahydrocannabinol ($\Delta^9$-THC-C$_5$), $\Delta^9$-tetrahydrocannabinol-C$_4$ ($\Delta^9$-THC-C$_4$), $\Delta^9$-tetrahydrocannabivarin ($\Delta^9$-THCV-C$_3$), $\Delta^9$-tetrahydrocannabiorcol ($\Delta^9$-THCO-C$_1$), $\Delta^9$-tetrahydrocannabinolic acid A ($\Delta^9$-THCA-C$_5$ A), $\Delta^9$-tetrahydrocannabinolic acid B ($\Delta^9$-THCA-C$_5$ B), $\Delta^9$-tetrahydrocannabinolic acid-C$_4$ A and/or B ($\Delta^9$-THCA-C$_4$ A and/or B), $\Delta^9$-tetrahydrocannabivarinic acid A ($\Delta^9$-THCVA-C$_3$ A), $\Delta^9$-tetrahydrocannabiorcolic acid A and/or B ($\Delta^9$-THCOA-C$_1$ A and/or B), (−)-$\Delta^8$-trans-(6aR,10aR)-$\Delta^8$-tetrahydrocannabinol ($\Delta^8$-THC-C$_5$), (−)-$\Delta^8$-trans-(6aR,10aR)-tetrahydrocannabinolic acid A ($\Delta^8$-THCA-C$_5$ A), and (−)-(6aS,10aR)-$\Delta^9$-tetrahydrocannabinol ((−)-cis-$\Delta^9$-THC-C$_5$).

Embodiments of the present invention may suitably be used to extract any one or more terpenes and terpenoids from *Cannabis* or other plant material. Terpenes and terpenoids amenable to extraction by embodiments of the present invention include, but are not limited to, endo-borneol; δ-carene; bornyl acetate; α-ylangene; α-copaene; aromadendrene; eremophilene; longifolene; β-guaiene; valencene; β-bisabolene; γ-cadinene; β-selinene; neophytadiene; ferruginol; aristolone; β-amyrin; oleanane; ketoursene; α-amyrin; iridoids; iridoid glycosides; steroids, e.g. campesterol, β-sitosterol, γ-sitosterol, stigmasterol, tocopherols, cholesterol, testosterone, cholecalciferol, and ecdysone; hemiterpenoids, e.g. isoprene, prenol, and isovaleric acid; acyclic monoterpenes, e.g. ocimene and myrcenes; monocyclic monoterpenes, e.g. limonene, terpinene, phellandrene, and umbellulone; bicyclic monoterpenes, e.g. pinene α, pinene β, camphene, thujene, sabinene, and carene; acyclic monoterpenoids, e.g. linalool, citronellal, citral, citronellol, geraniol, and geranyl pyrophosphate; monocyclic monoterpenoids, e.g. grapefruit mercaptan, menthol, p-cymene, thymol, perillyl alcohol, and carvacrol; bicyclic monoterpenoids, e.g. camphor, borneol, eucalyptol, halomon, and ascaridole; sesquiterpenoids, e.g. farnesyl pyrophosphate, artemisinin, and bisabolol; diterpenoids, e.g.

geranylgeranyl pyrophosphate, gibberellin, retinol, retinal, phytol, taxol, forskolin, aphidicolin, and salvinorin A; sesterterpenoids, e.g. geranylfarnesol; non-steroidal triterpenoids, e.g. saponins, squalene, lanosterol, oleanolic acid, ursolic acid, betulinic acid, and moronic acid); sesquarterpenes and sesquarterpenoids, e.g. ferrugicadiol and tetraprenylcurcumene; carotenes, e.g. α-carotene, β-carotene, γ-carotene, δ-carotene, lycopene, neurosporene, phytofluene, and phytoene; xanthophylls, e.g. canthaxanthin, cryptoxanthin, zeaxanthin, astaxanthin, lutein, and rubixanthin; polyterpenoids; norisoprenoids, e.g. 3-oxo-α-ionol, 7,8-dihydroionone, and precursors thereto; and activated isoprenes, e.g. isopentenyl pyrophosphate (IPP), dimethylallyl pyrophosphate (DMAPP), and precursors thereto.

The invention is further described by the following illustrative, non-limiting Examples.

Example 1

Static Batch

An extraction system according to the present invention comprised a heated column partially submerged in a hot oil bath allowing the flow of nitrogen gas through. A thermocouple in the extraction system determined the temperature achieved by the feedstock as it was exposed to the gas during operation of the extraction system.

For all test cases, the feedstock, a CBD-rich hemp material, was first dried to less than 1% moisture before entering the extraction system. The flow of nitrogen through the extraction system was not initiated until the hemp reached an appropriate temperature, as determined by the thermocouple. Upon reaching the desired temperature, the feedstock was exposed to nitrogen gas. A summary of the results is presented in Table 1. Cannabinoid composition was measured in stratified samples taken from the extraction product after the allotted time, with the sample that achieved highest removal of Cannabidiol (CBD) reported below. The times shown in Table 1 represent the elapsed time after the flow of nitrogen was initiated.

TABLE 1

Batch Extraction Study of Cannabinoids from Hemp

| Pressure (in Hg absolute) | Gas flow rate (L/min) | Temperature (° C.) | Time (min) | % CBD removal |
|---|---|---|---|---|
| 1.5 | 3.25 | 160 | 90 | 88 |
| 1.5 | 3.25 | 165 | 90 | 86 |
| 3.0 | 5.00 | 165 | 90 | 66 |
| 3.0 | 5.00 | 165 | 90 | 69 |
| 3.0 | 5.00 | 165 | 180 | 81 |

Results from this Example reinforce the necessity of achieving specific parameters, especially system pressure, in order to attain optimal CBD removal rates. Overall, greater removal is associated with lower absolute pressure in the extraction system. As Example 1 illustrates, a doubling of the absolute system pressure (from 1.5 inHg to 3.0 inHg) cannot be completely compensated for by a doubling of the extraction time (from 90 minutes to 180 minutes).

Example 2

Continuous Flow

Crushed pelletized hemp plant material as the feed material was processed in a continuous agitated vessel; at a moisture content of 15%, the hemp plant material comprised 6.52 wt % CBD and 0.26 wt % THC. The feedstock was untreated before entering the agitator and heated at 170° C. for 60 minutes at 20 torr absolute to ensure all water and low boiling point volatiles had been removed from the feedstock. The pressure was thereafter decreased to 2 torr absolute, and samples of the feedstock were retrieved at several intervals over a 120-minute period to examine the proportion of CBD still residing in the feedstock. The results from this 120-minute period are illustrated in FIG. 4.

Figure 4:
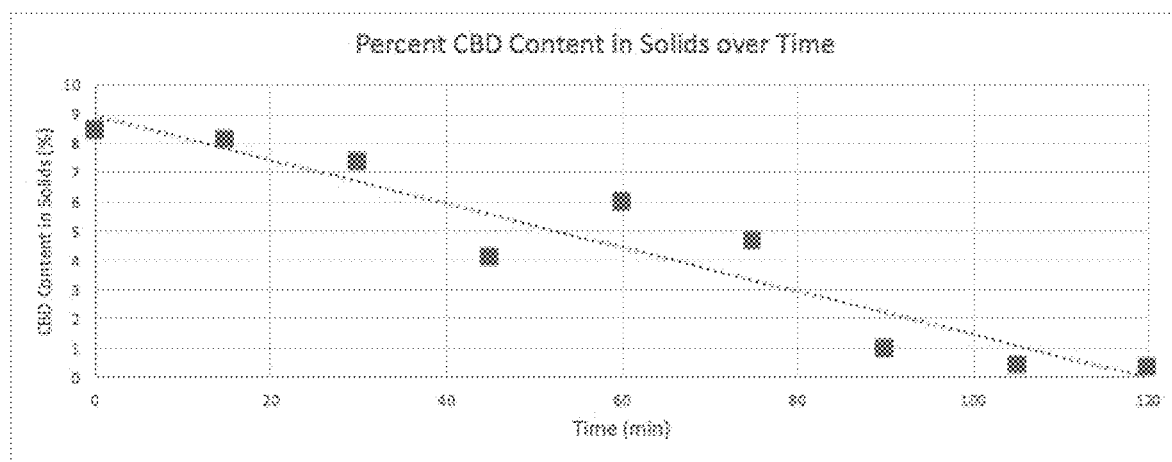
FIG. 4 is a graph showing the CBD content of a crushed pelletized hemp plant material as a function of extraction time in Example 2 of the present application.

As FIG. 4 illustrates, over 90% of the native CBD was removed from the hemp solids in the continuous process used for this Example.

The oil condensed in the extraction system was collected and its chemical composition quantified via GCMS. The cannabinoid profile of the oil is presented in Table 2.

TABLE 2

Cannabinoid Profile of Oil from Continuous Extraction Process

| Cannabinoid | Weight fraction in product | |
|---|---|---|
| | mg/g | percent |
| Cannabichromene (CBC) | 15.6 | 1.6 |
| Cannabidiol (CBD) | 793.3 | 79.3 |
| Cannabidiolic acid (CBD-A) | 0 | 0.0 |
| Cannabidivarin (CBDV) | 0 | 0.0 |
| Cannabigerol (CBG) | 10.2 | 1.0 |
| Cannabinol (CBN) | 7.6 | 0.8 |
| Δ-8 tetrahydrocannabinol | 10.9 | 1.1 |
| Δ-9 tetrahydrocannabinol (THC) | 33.5 | 3.4 |
| Δ-9 tetrahydrocannabinolic acid (THC-A) | 0 | 0.0 |
| Total | 871.1 | 87.1 |

The continuous process of Example 2 extracts the cannabinoids present in the plant material, exhibiting negligible fractionation between cannabinoids; a CBD:THC weight ratio in the extract product was about 23.7, similar to the ratio in the feedstock of about 25.1. This Example thus illustrates that a high-cannabinoid product (80 wt % or higher) can be obtained from a cannabinoid-rich feedstock by the use of systems and methods of the present invention.

Example 3

Laboratory Scale System

An extraction system as illustrated in FIG. 1 was operated at a throughput rate of 100 pounds of plant material per day. The results obtained by this system for various runs are illustrated in Table 3; variables subscripted "1" represent conditions in the preheater 310, and variables sub scripted "2" represent conditions in the evaporator 320.

TABLE 3

Summary of Results from 100 lb/day System

| Temp₁ (° C.) | Time₁ (min) | Temp₂ (° C.) | Time₂ (min) | Pressure₁ (inHg absolute) | Motive gas | Gas temp. (° C.) | Gas flow rate (SLPM) | % CBD removal |
|---|---|---|---|---|---|---|---|---|
| 165 | 25 | 175 | 45 | 3 | $N_2$ | 250 | 65 | 64 |
| 145 | 10 | 165 | 60 | 3 | $N_2$ | 230 | 70 | 70 |
| 145 | 25 | 165 | 45 | 2 | $CO_2$ | 180 | 66 | 71 |
| 155 | 25 | 165 | 45 | 2 | $N_2$ | 250 | 65 | 72 |
| 185 | 25 | 175 | 45 | 2 | $N_2$ | 250 | 65 | 74 |
| 185 | 25 | 175 | 45 | 0.2 | $N_2$ | 250 | 2 | 77 |
| 145 | 10 | 165 | 60 | 2 | $CO_2$ | 230 | 70 | 80 |
| 145 | 25 | 165 | 45 | 2 | $CO_2$ | 180 | 70 | 83 |
| 135 | 25 | 165 | 45 | 2 | $CO_2$ | 180 | 65 | 83 |

Results were analyzed from the feedstock exiting and collecting in the collection tank 400, recorded as a percentage of the cannabinoid no longer in the feedstock, and therefore inferred to have been stripped by the motive gas.

As Example 3 illustrates, greater cannabinoid removal is generally associated with lower pressures. Runs that resulted in the highest cannabinoid removal rates tended to involve nearly absolute vacuum conditions at high temperatures, while runs with comparatively inhibited cannabinoid removal overall operated at higher pressures.

Example 4

Feedstock, Spent Feed, and Oil Comparisons

Table 4 illustrates a comparison of the cannabinoid content of the THC-rich feedstock utilized in Example 3 and the cannabinoid content of the extract produced by the process of Example 3. Results were quantified by HPLC.

TABLE 4

Comparison of Feedstock to Product

| Cannabinoid | wt % in feedstock | wt % in product |
|---|---|---|
| Cannabidiol (CBD) | 0.00 | 0.00 |
| Cannabidiolic acid (CBD-A) | 0.00 | 0.00 |
| Cannabigerol (CBG) | 0.00 | 0.19 |
| Cannabinol (CBN) | 0.00 | 0.23 |
| Δ-9 tetrahydrocannabinol (THC) | 1.38 | 4.32 |
| Δ-9 tetrahydrocannabinolic acid (THC-A) | 8.86 | 0.00 |

As Example 4 illustrates, systems and methods of the present invention are effective to completely decarboxylate cannabinoids present in the feedstock; by way of non-limiting example, in the product, THC is present in the free/decarboxylated form in much greater amounts than in the feed material, whereas the quantity of the carboxylated THC-A is negligible.

As described throughout this disclosure, the present inventors have unexpectedly found that the methods and systems of the present invention provide various advantages and benefits relative to the chemical extraction methods and systems of the prior art. Particularly, the methods and systems of the present invention are effective to continuously extract chemical compounds from a solid feedstock material at low pressures. To the best of the present inventors' understanding, no currently existing method or system can achieve all of these advantages (continuous operation, solid feedstock, low pressure).

The invention illustratively disclosed herein suitably may be practiced in the absence of any element which is not specifically disclosed herein. It is apparent to those skilled in the art, however, that many changes, variations, modifications, other uses, and applications of the invention are possible, and also changes, variations, modifications, other uses, and applications which do not depart from the spirit and scope of the invention are deemed to be covered by the invention, which is limited only by the claims which follow.

The foregoing discussion of the invention has been presented for purposes of illustration and description. The foregoing is not intended to limit the invention to the form or forms disclosed herein. In the foregoing Detailed Description of the Invention, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of the Invention, with each claim standing on its own as a separate preferred embodiment of the invention.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

The invention claimed is:

1. A method for extracting at least one chemical compound from plant material without the use of a solvent, comprising:
   a) preparing a feedstock by at least one of chopping, cutting, treating, pelletizing, and grinding the plant material;
   b) preheating the feedstock to a first temperature at atmospheric or sub-atmospheric pressure for a preselected time to form a preheated feedstock;

c) heating the preheated feedstock to a second temperature at sub-atmospheric pressure in an evaporation chamber to form a heated feedstock;

d) introducing a heated motive gas through the evaporation chamber to drive the at least one chemical compound from the heated feedstock, thereby forming a pregnant motive gas; and e) condensing a portion of the pregnant motive gas to recover the at least one chemical compound.

2. The method of claim 1, wherein the plant material comprises a plant of the genus *Cannabis*.

3. The method of claim 1, wherein the first temperature is at least about 110° C.

4. The method of claim 1, wherein the first time is between about 10 minutes and about 120 minutes.

5. The method of claim 1, wherein the second temperature is between about 120° C. and about 200° C.

6. The method of claim 1, wherein the second time is between about 20 minutes and about 200 minutes.

7. The method of claim 1, wherein the motive gas comprises a non-oxidizing gas.

8. The method of claim 7, wherein the motive gas comprises at least one gas selected from the group consisting of helium, argon, an inert gas other than helium and argon, air, nitrogen, $CO_2$, and superheated steam.

9. The method of claim 1, wherein a temperature of the heated motive gas in step d) is between about 120° C. and about 250° C.

10. The method of claim 1, wherein the at least one chemical compound comprises at least one cannabinoid.

11. The method of claim 1, wherein the at least one chemical compound comprises at least one terpene or terpenoid.

12. A system for extracting at least one chemical compound from plant material without the use of a solvent, comprising:
   a) a feedstock preparation unit, configured to size-reduce the plant material by at least one of chopping, cutting, grinding, and shredding to form a feedstock;
   b) a preheater, configured to receive the feedstock from the feedstock preparation unit and heat the feedstock at sub-atmospheric or atmospheric pressure to drive off moisture and low-boiling volatile components to form a preheated feedstock;
   c) a vacuum evaporator, configured to receive the preheated feedstock from the preheater;
   d) a means for introducing a motive gas to the evaporator to form a pregnant motive gas; and
   e) a recovery unit, configured to receive the pregnant motive gas from the evaporator and to condense the pregnant motive gas to recover the at least one chemical compound.

13. The system of claim 12, wherein the pressures in the preheater and the vacuum evaporator are both between about 0.02 inHg absolute and about 14 inHg absolute.

14. The system of claim 12, configured to drive a first chemical compound from the feedstock in the preheater and a second chemical compound from the preheated feedstock in the vacuum evaporator, and to recover the first and second chemical compounds in the recovery unit.

15. A system for extracting at least one chemical compound from plant material without the use of a solvent, comprising:
   a) a feedstock preparation unit, configured to size-reduce the plant material to form a feedstock;
   b) a preheater, configured to receive the feedstock from the feedstock preparation unit and heat the feedstock at sub-atmospheric or atmospheric pressure to drive off moisture and low-boiling volatile components to form a preheated feedstock;
   c) a means for delivering a motive gas to the preheater to form a first pregnant motive gas;
   d) a first recovery unit, configured to receive the first pregnant motive gas from the preheater and condense the pregnant motive gas to recover moisture and low-boiling volatile components;
   e) a vacuum evaporator, configured to receive the preheated feedstock from the preheater;
   f) a means for introducing a motive gas to the evaporator to form a second pregnant motive gas; and
   g) a second recovery unit, configured to receive the second pregnant motive gas from the evaporator and to condense the second pregnant motive gas to recover the at least one chemical compound.

16. The system of claim 15, wherein the pressure in the preheater is about atmospheric pressure and the pressure in the vacuum evaporator is between about 0.02 inHg absolute and about 14 inHg.

17. The system of claim 15, configured to drive a first chemical compound from the feedstock in the preheater and collect the first chemical compound in the first recovery unit, and to drive a second chemical compound from the preheated feedstock in the vacuum evaporator and collect the second chemical compound in the second recovery unit.

18. A continuous method for extracting a chemical compound from solid plant material without the use of a solvent, comprising:
   a) providing a continuous flow of solid plant material;
   b) contacting the solid plant material with an introduced non-oxidizing motive gas stream at sub-atmospheric pressure to form a pregnant motive gas comprising the chemical compound; and
   c) condensing the chemical compound from the pregnant motive gas.

* * * * *